(12) United States Patent
Hayashi et al.

(10) Patent No.: US 11,919,540 B2
(45) Date of Patent: Mar. 5, 2024

(54) REMOTE SUPPORT SYSTEM AND REMOTE SUPPORT METHOD

(71) Applicant: TOYOTA JIDOSHA KABUSHIKI KAISHA, Toyota (JP)

(72) Inventors: Yusuke Hayashi, Susono (JP); Taichi Kawanai, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 110 days.

(21) Appl. No.: 17/677,507

(22) Filed: Feb. 22, 2022

(65) Prior Publication Data
US 2022/0266865 A1 Aug. 25, 2022

(30) Foreign Application Priority Data
Feb. 24, 2021 (JP) .................................. 2021-027862

(51) Int. Cl.
*B60W 60/00* (2020.01)
*B60W 40/105* (2012.01)

(52) U.S. Cl.
CPC ...... *B60W 60/0017* (2020.02); *B60W 40/105* (2013.01); *B60W 60/0016* (2020.02); *B60W 2554/4041* (2020.02); *B60W 2554/4048* (2020.02); *B60W 2554/4049* (2020.02)

(58) Field of Classification Search
None
See application file for complete search history.

(56) References Cited

U.S. PATENT DOCUMENTS

| 9,008,890 | B1 | 4/2015 | Herbach et al. |
| 10,604,152 | B2* | 3/2020 | Burford .......... B60W 30/18072 |
| 2015/0046058 | A1 | 2/2015 | Nagata |
| 2017/0371338 | A1 | 12/2017 | Kamata et al. |
| 2018/0196437 | A1 | 7/2018 | Herbach et al. |

(Continued)

FOREIGN PATENT DOCUMENTS

| JP | 2017-147626 A | 8/2017 |
| JP | 2018-077649 A | 5/2018 |
| WO | 2013/136492 A1 | 9/2013 |

OTHER PUBLICATIONS

U.S. Appl. No. 17/677,014, filed Feb. 22, 2022 Yusuke Hayashi et al.

(Continued)

*Primary Examiner* — James J Lee
*Assistant Examiner* — David Hatch
(74) *Attorney, Agent, or Firm* — Dinsmore & Shohl LLP

(57) ABSTRACT

At least one processor of a vehicle is configured to execute at least one program to: generate a speed plan for a first travel route from a blind spot elimination position to a position specified by a control standby condition, the speed plan specifying a speed of the vehicle for a position on the first travel route so as to meet a requirement that the vehicle be decelerated at a predetermined allowable deceleration or less for a predetermined time from the blind spot elimination position to satisfy the control standby condition; and instruct, for a second travel route from a current position of the vehicle to the blind spot elimination position, the vehicle to travel along the second travel route by autonomous driving so as to cause the vehicle to reach a speed specified by the speed plan at the blind spot elimination position.

5 Claims, 7 Drawing Sheets

(56) References Cited

U.S. PATENT DOCUMENTS

2020/0409368 A1* 12/2020 Caldwell .............. G05D 1/0212
2021/0012662 A1* 1/2021 Sun ..................... B60W 50/085
2022/0066440 A1* 3/2022 Sucan ................. B60W 60/001

OTHER PUBLICATIONS

U.S. Appl. No. 17/676,998, filed Feb. 22, 2022 Yusuke Hayashi et al.

* cited by examiner

FIG. 3
BLIND SPOT CAUSED BY LANDMARK
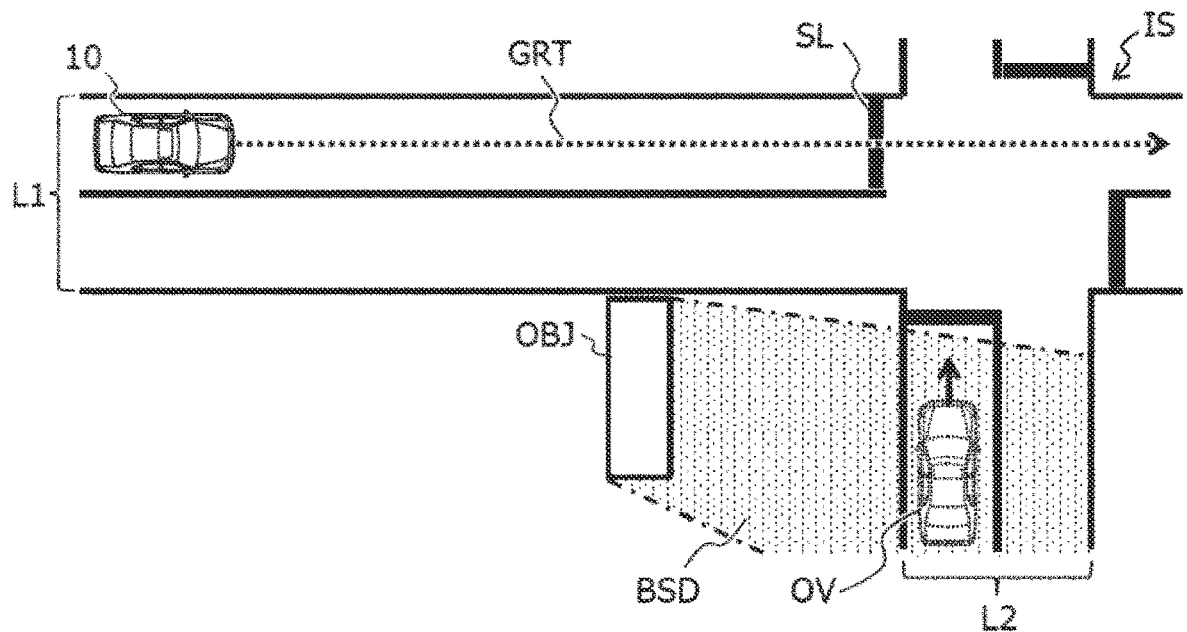
BLIND SPOT CAUSED BY DETECTION CAPABILITY OF SENSOR
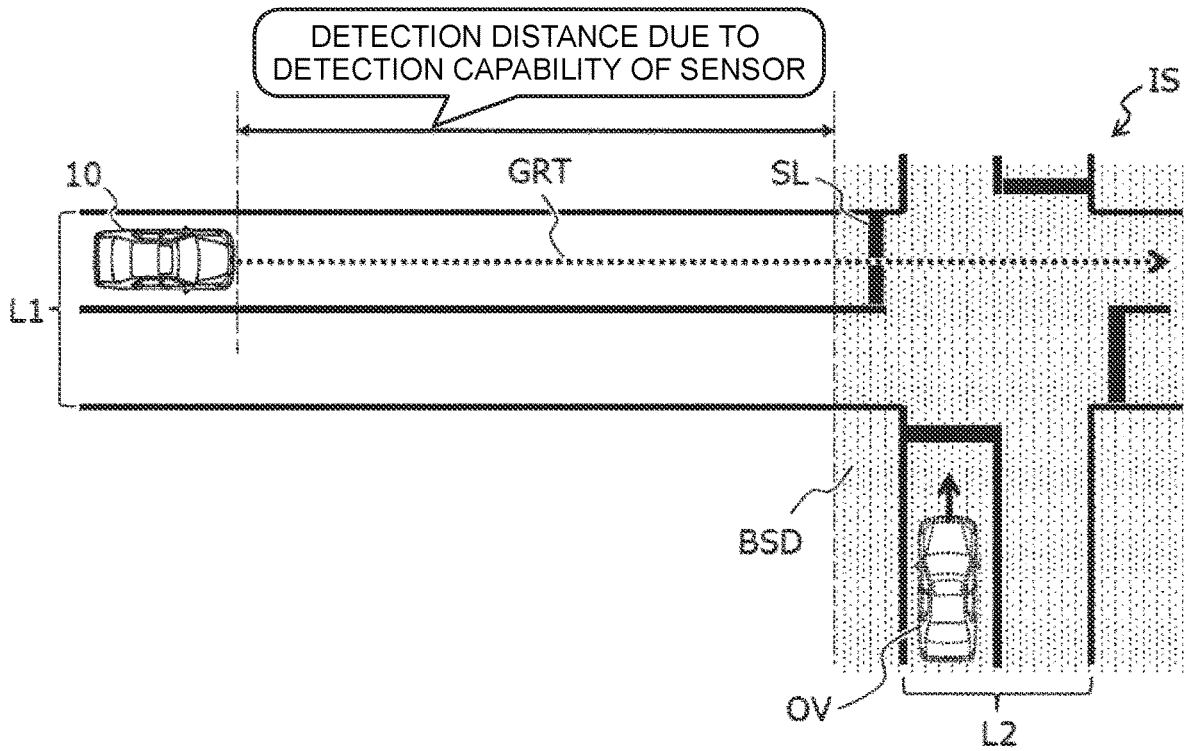

FIG. 4
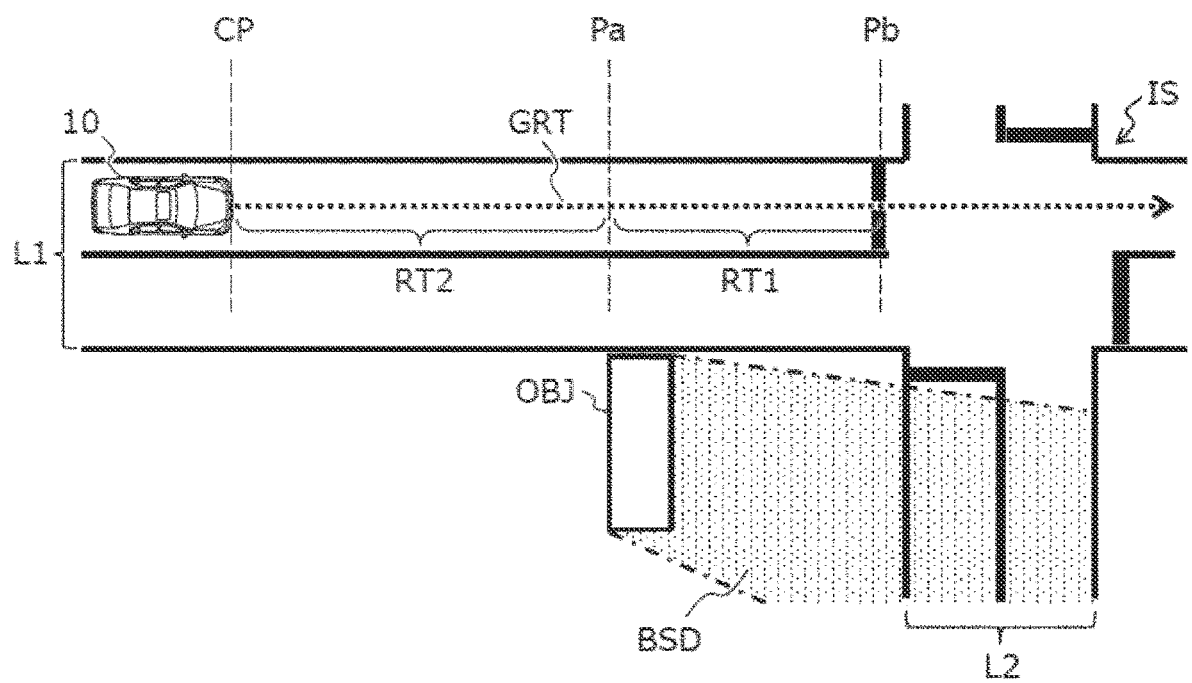
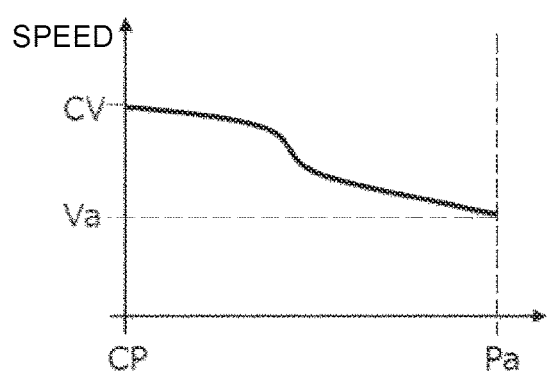
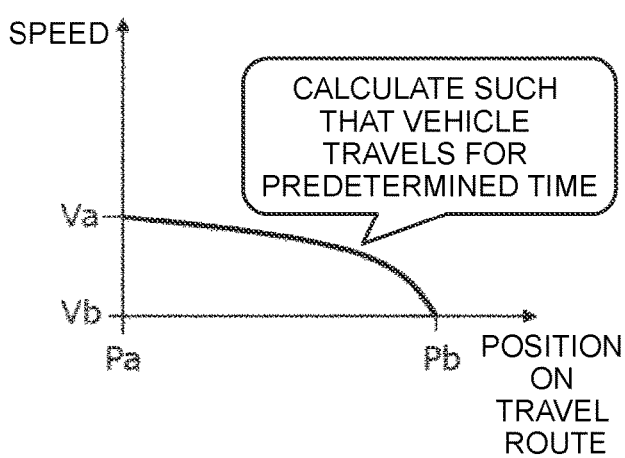

FIG. 7
WHEN BLIND SPOT IS CAUSED BY LANDMARK
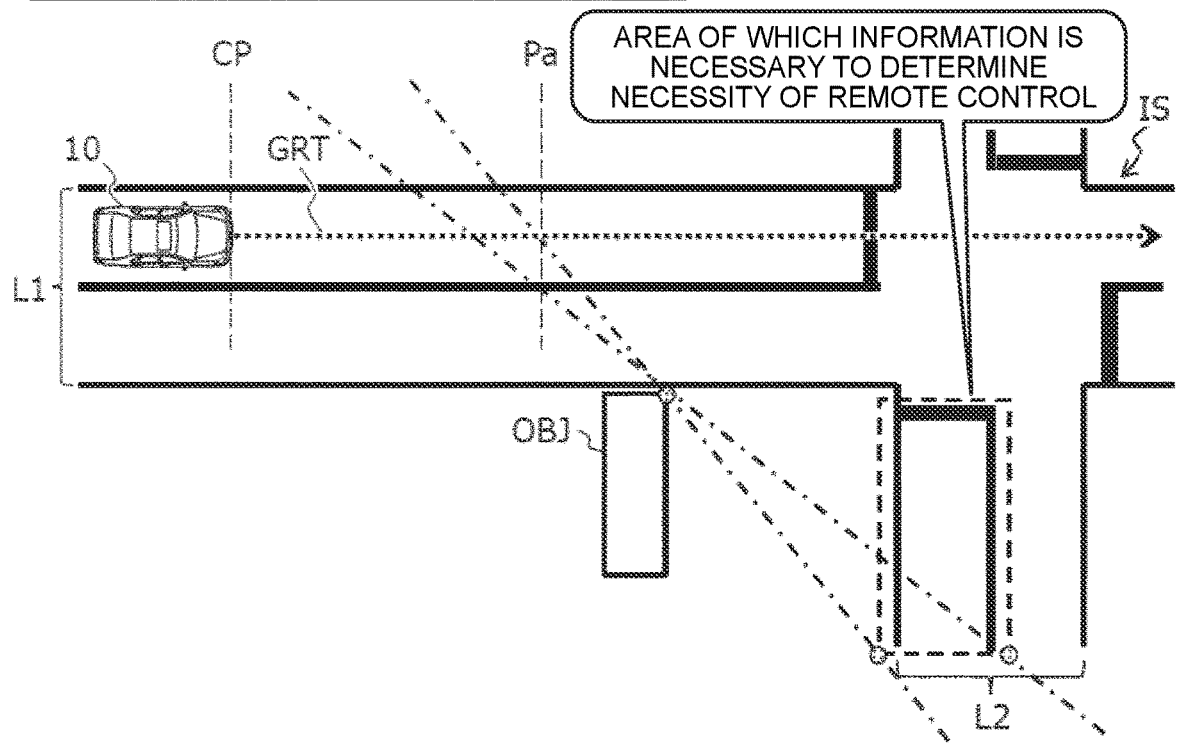
WHEN BLIND SPOT IS CAUSED BY
DETECTION CAPABILITY OF SENSOR
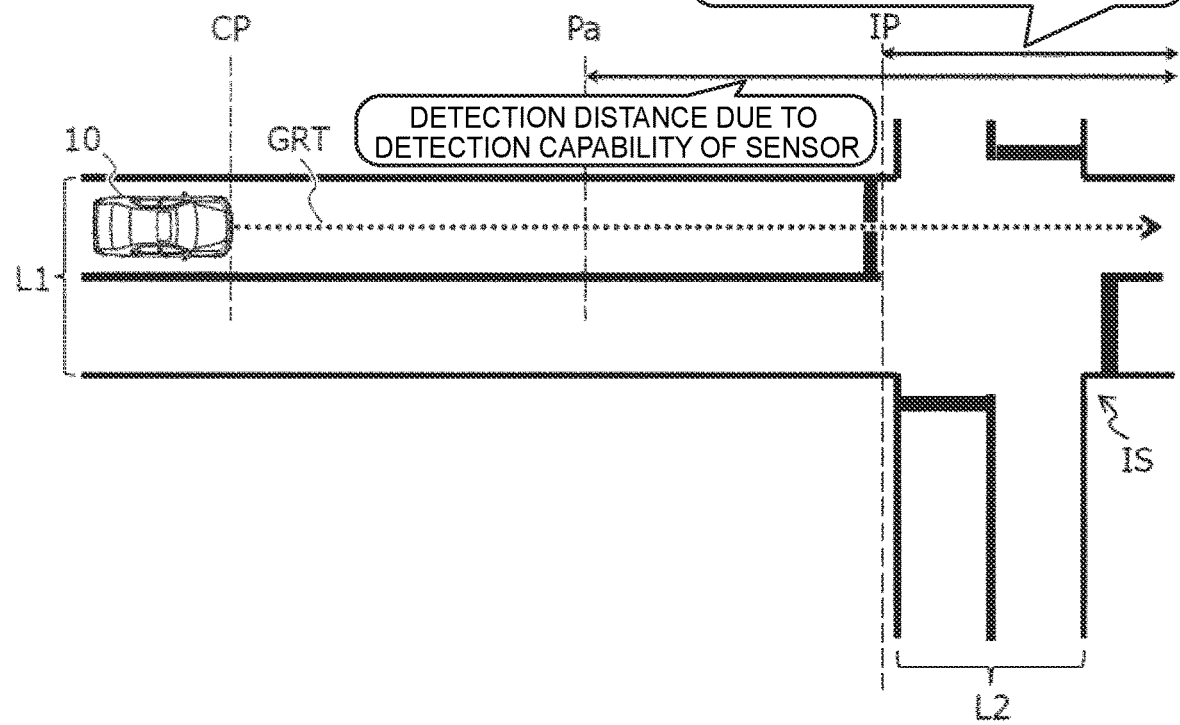

REMOTE SUPPORT SYSTEM AND REMOTE SUPPORT METHOD

CROSS-REFERENCE TO RELATED APPLICATION

This application claims priority to Japanese Patent Application No. 2021-027862 filed on Feb. 24, 2021, incorporated herein by reference in its entirety.

BACKGROUND

1. Technical Field

The present disclosure relates to remote support systems and remote support methods for sending a remote control request for a vehicle to a remote operator.

2. Description of Related Art

Japanese Unexamined Patent Application Publication No. 2017-147626 (JP 2017-147626 A) discloses a remote control system that can reduce the burden on an operator. In this remote control system, when a vehicle enters an area for remote control, the vehicle sends a remote control request to a control center associated with the area for remote control, and the vehicle having sent the remote control request is remotely controlled.

Japanese Unexamined Patent Application Publication No. 2018-77649 (JP 2018-77649 A) also describes the technical level of the present technical field.

SUMMARY

When there is a blind spot where information cannot be detected due to a landmark around the vehicle, the detection ability of a sensor, etc., whether the vehicle is in the situation where the vehicle needs remote control may be different depending on the traffic conditions in the blind spot. In this case, when the area for remote control is an area where there is a blind spot based on the technique of JP 2017-147626 A, a remote control request is sent frequently, and the burden on the remote operator may increase.

On the other hand, when whether remote control is necessary is determined based on the actually detected information, not enough determination time may be given to the remote operator before the remote operator actually starts remote control, namely before the vehicle waits for the start of remote control. As a result, the burden on the remote operator may increase. Moreover, the vehicle may be subjected to sudden deceleration control in order to wait for the start of remote control. This may reduce the safety of the vehicle and disrupt the traffic flow behind the vehicle.

The present disclosure was made in view of the above problems, and it is an object of the present disclosure to provide a remote support system and a remote support method that do not perform sudden deceleration control for a vehicle and can reduce the burden on a remote operator even when there is a blind spot around the vehicle.

A first aspect of the present disclosure relates to a remote support system that sends a remote control request to a remote operator when a vehicle that is traveling by autonomous driving gets into a situation where the vehicle needs remote control. The remote support system includes at least one memory storing at least one program, and at least one processor coupled to the at least one memory. The at least one processor is configured to execute the at least one program to: acquire map information around the vehicle, surrounding environment information on a surrounding environment of the vehicle, and vehicle environment information on a traveling state of the vehicle; determine based on the map information, the surrounding environment information, and the vehicle environment information whether the vehicle is in the situation where the vehicle needs the remote control, calculate a blind spot based on the surrounding environment information and the vehicle environment information, the blind spot being an area where remote control determination information is detected and where the surrounding environment information is not able to be detected from a current position of the vehicle, and the remote control determination information being information for determining whether the vehicle is in the situation where the vehicle needs the remote control; calculate a blind spot elimination position, the blind spot elimination position being a position of the vehicle at which the blind spot is eliminated; calculate a control standby condition based on the map information or the surrounding environment information, the control standby condition specifying a position and a speed of the vehicle at which the vehicle waits for start of the remote control when the at least one processor determines that the vehicle is in the situation where the vehicle needs the remote control; generate a speed plan for a first travel route from the blind spot elimination position to the position specified by the control standby condition, the speed plan specifying a speed of the vehicle for a position on the first travel route so as to meet a requirement that the vehicle be decelerated at a predetermined allowable deceleration or less for a predetermined time from the blind spot elimination position to satisfy the control standby condition; and Instruct for a second travel route from the current position of the vehicle to the blind spot elimination position, the vehicle to travel along the second travel route by autonomous driving so as to cause the vehicle to reach the speed specified by the speed plan at the blind spot elimination position.

In the above aspect, the predetermined time may be a determination time for the remote operator.

In the above aspect, the at least one processor may be configured to execute the at least one program to: make a first determination of whether the at least one processor is able to generate the speed plan that meets the requirement; make, for the second travel route, a second determination of whether the vehicle is able to be decelerated at the allowable deceleration or less until the vehicle reaches the speed specified by the speed plan at the blind spot elimination position; and stop the autonomous driving on the second travel route and send the remote control request to the remote operator when a result of the first determination or the second determination is negative.

In the above aspect, the at least one processor may be configured to execute the at least one program to instruct the vehicle to travel along the first travel route by autonomous driving according to the speed plan when the at least one processor determines at the blind spot elimination position that the vehicle is in the situation where the vehicle needs the remote control.

A second aspect of the present disclosure relates to a remote support method in which a remote control request is sent to a remote operator when a vehicle that is traveling by autonomous driving gets into a situation where the vehicle needs remote control. The remote support method includes: acquiring, by at least one processor that executes at least one program, map information around the vehicle, surrounding environment information on a surrounding environment of the vehicle, and vehicle environment information on a traveling state of the vehicle; determining, by the at least one processor, whether the vehicle is in the situation where the vehicle needs the remote control, based on the map information, the surrounding environment information, and the vehicle environment information; calculating a blind spot by the at least one processor based on the surrounding environment information and the vehicle environment information, the blind spot being an area where remote control determination information is detected and where the surrounding environment information is not able to be detected from a current position of the vehicle, and the remote control determination information being information for determining whether the vehicle is in the situation where the vehicle needs the remote control; calculating a blind spot elimination position by the at least one processor, the blind spot elimination position being a position of the vehicle at which the blind spot is eliminated; calculating a control standby condition by the at least one processor based on the map information or the surrounding environment information, the control standby condition specifying a position and a speed of the vehicle at which the vehicle waits for start of the remote control when the at least one processor determines that the vehicle is in the situation where the vehicle needs the remote control; generating, by the at least one processor, a speed plan for a first travel route from the blind spot elimination position to the position specified by the control standby condition, the speed plan specifying a speed of the vehicle for a position on the first travel route so as to meet a requirement, the requirement being that the vehicle be decelerated at a predetermined allowable deceleration or less for a predetermined time from the blind spot elimination position to satisfy the control standby condition; and instructing, for a second travel route from the current position of the vehicle to the blind spot elimination position, the vehicle to travel along the second travel route by autonomous driving by the at least one processor so as to cause the vehicle to reach the speed specified by the speed plan at the blind spot elimination position.

In the above aspect, the remote support method may further include: making a first determination by the at least one processor, the first determination being a determination of whether the at least one processor is able to generate the speed plan that meets the requirement; making a second determination for the second travel route by the at least one processor, the second determination being a determination of whether the vehicle is able to be decelerated at the allowable deceleration or less until the vehicle reaches the speed specified by the speed plan at the blind spot elimination position; and stopping the autonomous driving on the second travel route and sending the remote control request to the remote operator by the at least one processor when a result of the first determination or the second determination is negative.

In the above aspect, the remote support method may further include instructing the vehicle to travel along the first travel route by autonomous driving according to the speed plan by the at least one processor when the at least one processor determines at the blind spot elimination position that the vehicle is in the situation where the vehicle needs the remote control.

According to the remote support system and the remote support method of the present disclosure, even when the vehicle is traveling by autonomous driving in the area where there is a blind spot and a determination is made at the blind spot elimination position that the vehicle is in the situation where the vehicle needs remote control, there will be the predetermined time until the vehicle satisfies the control standby condition, and the vehicle can be decelerated at the predetermined allowable deceleration or less to satisfy the control standby condition. As a result, sudden deceleration control for the vehicle will not be performed, and the burden on the remote operator can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a conceptual diagram showing an example in which a vehicle is traveling by autonomous driving in an area where there is a blind spot;

FIG. 4 is a conceptual diagram illustrating determination of the necessity of remote control by the remote support system of the embodiment;

FIG. 7 is a conceptual diagram showing an example of a blind spot elimination position that is calculated according to the blind spot in the case shown in FIG. 3.

DETAILED DESCRIPTION OF EMBODIMENTS

Hereinafter, an embodiment of the present disclosure will be described with reference to the drawings. Numerical values for each element that are mentioned in the following embodiment, such as the number, quantity, amount, and range of each element, are not intended to limit the disclosure to the mentioned numerical values unless otherwise specified or unless it is theoretically obvious that the disclosure is limited to the mentioned numerical values. Structures, steps, etc. that are described in the following embodiment are not necessary to the disclosure.

1. Overall Configuration of Remote Support System

Figure 1:
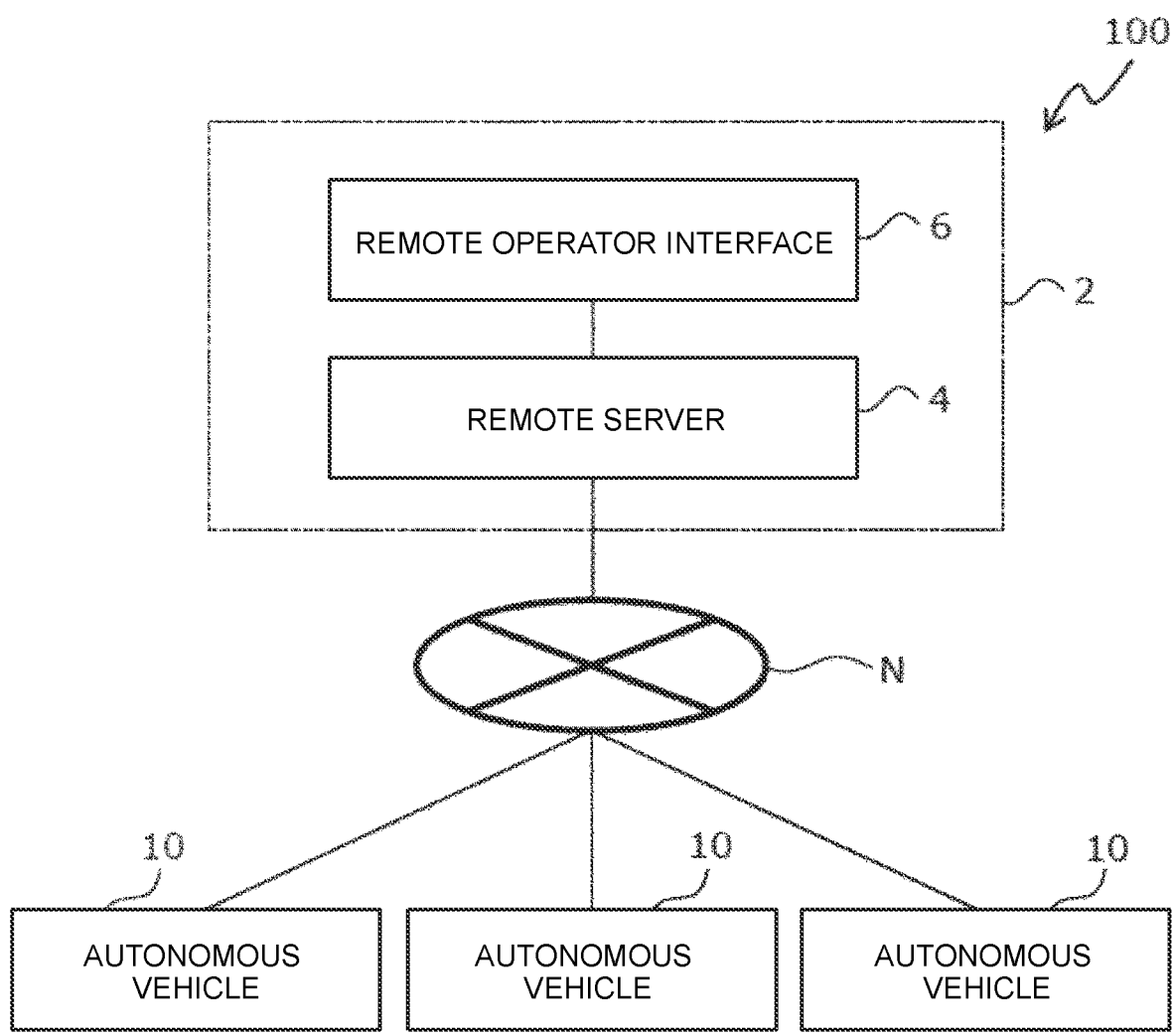
FIG. 1 is a block diagram showing a configuration example illustrating an overview of a remote support system according to an embodiment.

First, a schematic configuration of a remote support system of the present embodiment will be described. FIG. 1 is a block diagram showing a configuration example illustrating an overview of the remove support system according to the present embodiment. The remote support system 100 shown in FIG. 1 is a system that performs on an autonomous vehicle 10 remote control for controlling traveling of the autonomous vehicle 10. Hereinafter, the autonomous vehicle 10 that is used in the remote support system 100 is sometimes simply referred to as the "vehicle 10."

Remote control includes not only remote control including operation commands for any of acceleration, deceleration, and steering of the vehicle, but also driver assistance for assisting a part of perception or determination of the surrounding environment of the vehicle 10. Remote control is performed by a remote operator who stands by at a remote location. The number of remote operators who are used in the remote support system 100 is not limited. The number of vehicles 10 that are used in the remote support system 100 is not limited, either.

As shown in FIG. 1, the remote support system 100 includes the vehicles 10 and a remote control device 2. The remote control device 2 includes a remote server 4 and a remote operator interface 6 for the remote operator to perform input operations for remote control. The remote server 4 is connected to the vehicles 10 via a communication network N such that the remote server 4 can communicate with the vehicles 10. Various kinds of information are sent from the vehicles 10 to the remote server 4. The remote operator interface 6 includes, for example, an input device simulating a steering wheel, an accelerator pedal, and a brake pedal of a vehicle. Alternatively, the remote operator interface 6 includes an input device for inputting determination results in driver assistance.

In the remote support system 100, the remote operator performs remote control via the remote control device 2 in response to a remote control request sent from the vehicle 10. Typically, the remote operator performs input operations for remote control to the remote operator interface 6. The remote server 4 sends remote control commands to the vehicle 10 via the communication network N. The vehicle 10 travels according to the remote control commands sent from the remote control device 2. As for the configuration of the remote control device 2, a known technique can be used, and therefore detailed description thereof will be omitted.

2. Configuration of Autonomous Vehicle

Figure 2:
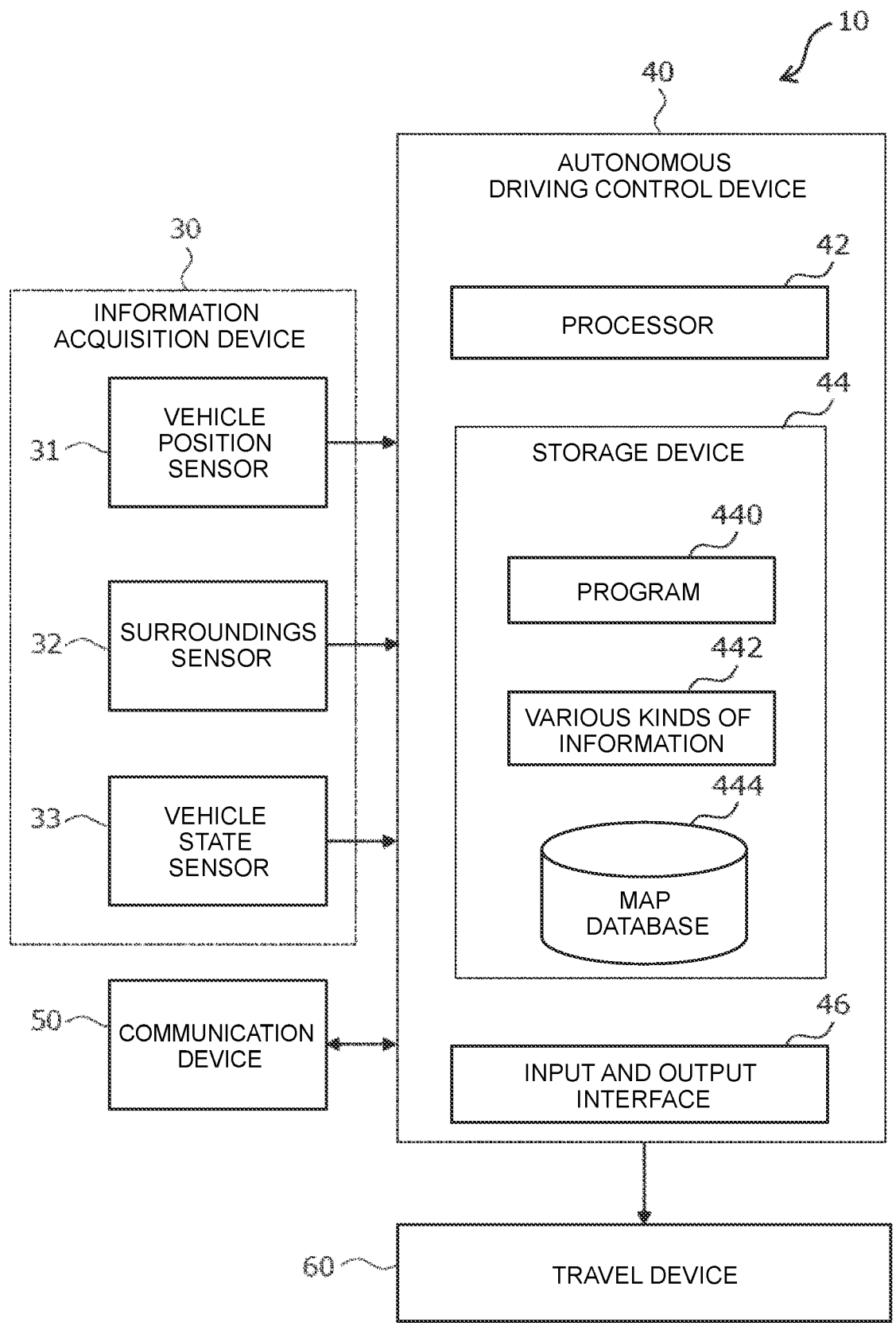
FIG. 2 is a block diagram showing an example of the configuration of an autonomous vehicle.

Next, an example of the configuration related to autonomous driving of the autonomous vehicle 10 that is applied to the remote support system 100 of the present embodiment will be described. FIG. 2 is a block diagram showing an example of the configuration of the autonomous vehicle 10. The vehicle 10 is an autonomous vehicle capable of autonomous driving. Regarding autonomous driving, it is herein assumed that the vehicle 10 drives at Level 3 or higher of driving automation defined by the Society of Automotive Engineers (SAE) The power source of the vehicle 10 is not limited.

The vehicle 10 includes an autonomous driving control device 40. The autonomous driving control device 40 has a function to perform autonomous driving of the vehicle 10 and a function to perform remote autonomous driving of the vehicle 10 according to remote control instructions sent from the remote operator. An information acquisition device 30, a communication device 50, and a travel device 60 are connected to the autonomous driving control device 40.

The information acquisition device 30 acquires and outputs information for the functions of the autonomous driving control device 40. In particular, the information acquisition device 30 detects and outputs vehicle environment information on the traveling state of the vehicle 10 and surrounding environment information on the surrounding environment of the vehicle 10. The information acquisition device 30 includes a vehicle position sensor 31, a surroundings sensor 32, and a vehicle state sensor 33.

The vehicle position sensor 31 detects the position and orientation of the vehicle 10. Examples of the vehicle position sensor 31 include a Global Positioning System (GPS) sensor. The GPS sensor receives signals sent from a plurality of GPS satellites and calculates the position and orientation of the vehicle 10 based on the received signals. The vehicle position sensor 31 may perform well-known localization to increase the accuracy of the current position of the vehicle 10. The information detected by the vehicle position sensor 31 is sent to the autonomous driving control device 40 as necessary as a part of the vehicle environment information.

The surroundings sensor 32 perceives surroundings information of the vehicle 10. Examples of the surroundings sensor 32 include a camera (imaging device), a laser imaging detection and ranging (LIDAR), and a radar. The surroundings information includes landmark information perceived by the surroundings sensor 32. Examples of a landmark include surrounding vehicles, pedestrians, roadside objects, obstacles, white lines, and traffic lights. The landmark information includes the relative position and relative speed of the landmark with respect to the vehicle 10. The information perceived by the surroundings sensor 32 is sent to the autonomous driving control device 40 as necessary as a part of the surrounding environment information.

The vehicle state sensor 33 detects vehicle information indicating the state of the vehicle 10. Examples of the vehicle state sensor 33 include a vehicle speed sensor, a lateral acceleration sensor, and a yaw rate sensor. The information detected by the vehicle state sensor 33 is sent to the autonomous driving control device 40 as necessary as a part of the vehicle environment information.

The communication device 50 communicates with the outside of the vehicle 10. For example, the communication device 50 sends and receives various kinds of information to and from the remote control device 2 via the communication network N. The communication device 50 also communicates with external devices such as roadside units, surrounding vehicles, and surrounding infrastructure. The roadside unit is a beacon device that sends, for example, traffic congestion information, traffic information for each lane, regulation information such as stop, and information on traffic conditions in blind spots. When the external device is a surrounding vehicle, the communication device 50 performs vehicle-to-vehicle communications (V2V communication) with the surrounding vehicle. When the external device is surrounding infrastructure, the communication device 50 performs vehicle-to-infrastructure communication (V2I communication) with the surrounding infrastructure.

The travel device 60 includes a steering device, a drive device, and a braking device. The steering device steers wheels of the vehicle 10. The drive device is a driving source that generates a driving force for the vehicle 10. Examples of the drive device include an engine and an electric motor. The braking device generates a braking force for the vehicle 10. The travel device 60 controls traveling of the vehicle 10 based on traveling controlled variables related to steering, acceleration, and deceleration of the vehicle 10.

The autonomous driving control device 40 is an information processing device that performs various processes for autonomous driving and remote autonomous driving. Typically, the autonomous driving control device 40 is a microcomputer including at least one processor 42, at least one storage device 44, and at least one input and output interface 46. The autonomous driving control device 40 is also referred to the electronic control unit (ECU).

Various kinds of information 442 are stored in the storage device 44. For example, the various kinds of information 442 include the surrounding environment information and vehicle environment information described above. Examples of the storage device 44 include a volatile memory, a non-volatile memory, and a hard disk drive (HDD).

The storage device 44 has a map database 444 stored therein. The map database 444 is a database that stores map information. The map information includes position information of roads, information on road shapes, number of lanes, lane widths, position information of intersections and branch points, and traffic environment information indicating the traffic environment such as levels of priority of roads. The map information may further include the position on the map and speed at which the vehicle 10 waits for the start of remote control when the remote control is performed. The vehicle 10 waiting for the start of remote control means that the vehicle 10 is ready to switch from autonomous driving to remote autonomous driving that is performed according to remote control commands sent from the remote operator. The map database 444 may be stored in a server capable of communicating with the vehicle 10, such as the remote server 4 of the remote control device 2.

The processor 42 includes a central processing unit (CPU). The processor 42 is coupled to the storage device 44 and the input and output interface 46. The storage device 44 has stored therein at least one program 440 related to autonomous driving and remote autonomous driving. Various functions of the autonomous driving control device 40 are implemented by the processor 42 reading and executing the program 440 stored in the storage device 44.

The input and output interface 46 is an interface for sending and receiving information to and from the remote control device 2. Various kinds of information generated by the autonomous driving control device 40 and a remote control request that will be described later are output to the remote control device 2 via the input and output interface 46.

3. Features of Remote Support System of Embodiment

The remote support system 100 of the present embodiment is characterized by a process for remote control that is performed when the vehicle 10 is traveling by autonomous driving in an area where there is a blind spot where the information acquisition device 30 cannot detect information due to a landmark around the vehicle 10, detection capability of the sensor, etc.

FIG. 3 is a conceptual diagram showing an example in which the vehicle 10 is traveling by autonomous driving in an area where there is a blind spot BSD. The upper part of FIG. 3 shows the case where there is a blind spot BSD due to a landmark OBJ, and the lower part of FIG. 3 shows the case where there is a blind spot BSD due to the detection capability of the sensor. In FIG. 3, the vehicle 10 is traveling in a lane L1 by autonomous driving. The vehicle 10 is supposed to go straight at an intersection IS of the lane L1 and a lane L2 according to a desired route GRT for autonomous driving. The desired route is a route set based on a destination, map information, and position information of the vehicle 10. In this case, it is sometimes necessary to determine based on information on traffic conditions in the lane L2 whether the vehicle 10 sends a remote control request and go straight at the intersection IS by remote control or the vehicle 10 continues autonomous driving and go straight at the intersection IS by autonomous driving. For example, in the case where the lane L2 is a lane prioritized over the lane L1, the vehicle 10 sends a remote control request when there is any other vehicle OV traveling straight in the lane L2, and continues autonomous driving when there is no other vehicle OV traveling straight in the lane L2.

In the example shown in FIG. 3, there is a blind spot BSD where the information acquisition device 30 cannot detect information due to the landmark OBJ around the vehicle 10 or the detection capability of the sensor. The blind spot BSD includes an area in the lane L2 where the information on traffic conditions for determining whether the vehicle 10 is in a situation where the vehicle 10 needs remote control (hereinafter sometimes referred to as "determination of the necessity of remote control") is detected. Accordingly, how to determine the necessity of remote control becomes an issue. Hereinafter, when there is any other vehicle OV traveling straight in the lane L2, it is determined that the vehicle 10 is in the situation where the vehicle 10 needs remote control. When there is no other vehicle OV traveling straight in the lane L2, it is determined that the vehicle 10 is not in the situation where the vehicle 10 needs remote control.

If it is assumed that there is another vehicle OV in the blind spot BSD, it is always determined that the vehicle 10 is in the situation where the vehicle 10 needs remote control, whenever the blind spot BSD includes the area of the lane L2. However, if the necessity of remote control is determined in this manner, a remote control request is sent regardless of the traffic conditions. Accordingly, a remote control request is sent frequently, and the burden on the remote operator may increase.

On the other hand, if the necessity of remote control is determined based on the actually detected information, it is determined unless another vehicle OV is detected that the vehicle 10 is not in the situation where the vehicle 10 needs remote control, even when there is another vehicle OV in the blind spot BSD. However, if it is determined that the vehicle 10 is in the situation where the vehicle 10 needs remote control when the blind spot BSD is eliminated, not enough determination time may be given to the remote operator before the remote operator actually starts remote control, namely before the vehicle 10 waits for the start of remote control. As a result, the burden on the remote operator may increase. Moreover, sudden deceleration control for the vehicle 10 may be performed in order to start remote control. This may reduce the safety of the vehicle 10 and disrupt the traffic flow behind the vehicle 10. When remote control is performed, the vehicle 10 waits for the start of the remote control at a specified position and speed. The sudden deceleration control is therefore performed to achieve that position and speed. For example, the vehicle 10 is controlled such that the vehicle 10 stops at the position of a stop line SL of the intersection IS.

Accordingly, the remote support system 100 of the present embodiment calculates a speed plan for the desired route GRT from the position where the blind spot BSD is eliminated (hereinafter also referred to as the "blind spot elimination position") to the position where the vehicle 10 waits for the start of remote control (hereinafter this route is also referred to as the "first travel route"). This speed plan specifies the speed of the vehicle 10 for the position on the first travel route so as to meet a specific requirement. The remote support system 100 then instructs the vehicle 10 to travel along the desired route GRT from the current position of the vehicle 10 to the blind spot elimination position (hereinafter this route is also referred to as the "second travel route") by autonomous driving such that the vehicle 10 reaches the speed specified by the speed plan at the blind spot elimination position.

FIG. 4 is a conceptual diagram illustrating determination of the necessity of remote control by the remote support system 100 of the present embodiment. The upper part of FIG. 4 shows the same situation as the upper part of FIG. 3 as a situation where the necessity of remote control is determined. The lower part of FIG. 4 shows a graph of an example of the speed plan calculated by the remote support system 100 when determining the necessity of remote control, and a graph of traveling of the vehicle 10 by autonomous driving along the second travel route RT2 as instructed by the remote support system 100.

In FIG. 4, Pa represents the blind spot elimination position. Pb represents the specified position where the vehicle 10 waits for the start of remote control when it is determined that the vehicle 10 is in the situation where the vehicle 10 needs remote control. In the example shown in FIG. 4, Vb is specified as the speed of the vehicle 10 at which the vehicle 10 waits for the start of remote control. Hereinafter, the position Pb and the speed Vb are also referred to as the "control standby conditions." CP and VP represent the current position and speed of the vehicle 10.

In FIG. 4, RT1 represents the first travel route, and RT2 indicates the second travel route.

First, the remote support system 100 generates a speed plan on the first travel route RT1. A first speed plan is generated so as to meet a requirement that the vehicle 10 be decelerated at a predetermined allowable deceleration or less for a predetermined time from the blind spot elimination position Pa to satisfy the control standby conditions. The predetermined time is given as the determination time until the remote operator who has received a remote control request grasps the surroundings of the vehicle 10 and the support content and actually starts the remote control. The predetermined allowable deceleration is applied to such an extent that the safety of the vehicle 10 is maintained and the traffic flow behind the vehicle 10 is not disrupted.

That is, by causing the vehicle 10 to travel along the first travel route RT1 according to the speed plan, sudden deceleration control for the vehicle 10 will not be performed, and enough determination time can be given to the remote operator between when the vehicle 10 is located at the blind spot elimination position Pa and when the vehicle 10 satisfy the control standby conditions. As a result, the burden on the remote operator can be reduced without reducing the safety of the vehicle and disrupting the traffic flow behind the vehicle 10. Moreover, the remote operator can start remote control as soon as the vehicle 10 satisfy the control standby conditions. This reduces disruption of the traffic flow due to the vehicle 10 waiting for the start of remote control.

Next, in order to allow the vehicle 10 to travel along the first travel route RT1 according to the generated speed plan, the remote support system 100 instructs the vehicle 10 to travel along the second travel route by autonomous driving such that the vehicle 10 reaches the speed Va specified by the speed plan at the blind spot elimination position Pa. The vehicle 10 can therefore travel according to the speed plan even when it is determined at the blind spot elimination position Pa that remote control is necessary. In particular, when it is determined at the blind spot elimination position Pa that remote control is necessary, the remote support system 100 instructs the vehicle 10 to travel along the first travel route RT1 by autonomous driving according to the speed plan.

The remote support system 100 determines whether the first speed plan can be generated so as to satisfy the above requirement (hereinafter also referred to as the "first determination process"). The remote support system 100 also determines for the second travel route RT2 whether the vehicle 10 can be decelerated at the predetermined allowable deceleration or less to the speed Va for the blind spot elimination position Pa specified by the first speed plan (hereinafter also referred to as the "second determination process").

In the remote support system 100, a remote control request is sent when the determination result of the first determination process or the second determination process is negative. In this case, the remote support system 100 stops such traveling of the vehicle 10 that the vehicle 10 reaches the speed Va at the blind spot elimination position Pa, and instructs the vehicle 10 to travel along the desired route GRT by autonomous driving so as to satisfy the control standby conditions.

According to such a remote support method of the remote support system 100, even when the vehicle 10 is traveling by autonomous driving in the area where there is a blind spot BSD and it is determined at the blind spot elimination position Pa that the vehicle 10 is in the situation where the vehicle 10 needs remote control, there will be the predetermined time until the vehicle 10 satisfies the control standby conditions, and the vehicle 10 can be decelerated at the predetermined allowable deceleration or less to satisfy the control standby conditions. Accordingly, sudden deceleration control for the vehicle will not be performed, and it is possible to prevent a remote control request from being sent frequently. It is also possible to reduce the burden on the remote operator while reducing reduction in safety of the vehicle 10 and disruption of the traffic flow behind the vehicle 10. It is also possible to reduce disruption of the traffic flow due to the vehicle 10 waiting for the start of remote control.

Hereinafter, the functional configuration and specific processes of the autonomous driving control device 40 of the remote support system 100 of the present embodiment will be described.

4. Functional Configuration of Autonomous Driving Control Device

Figure 5:
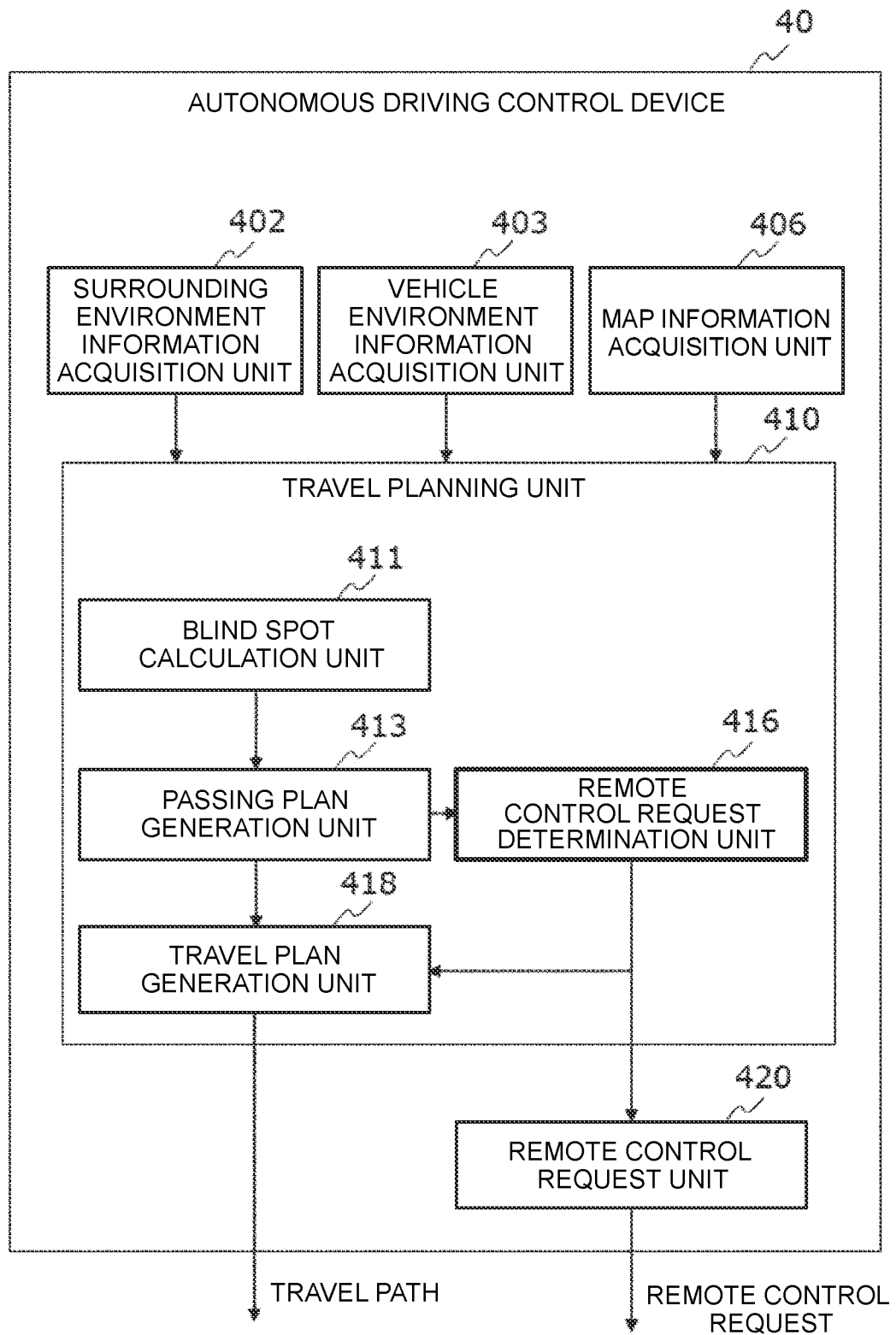
FIG. 5 is a functional block diagram showing a part of functions of an autonomous driving control device.

An example of the functional configuration of the autonomous driving control device 40 will be described. FIG. 5 is a functional block diagram showing a part of functions of the autonomous driving control device 40. The autonomous driving control device 40 includes a surrounding environment information acquisition unit 402, a vehicle environment information acquisition unit 403, a map information acquisition unit 406, a travel planning unit 410, and a remote control request unit 420.

The surrounding environment information acquisition unit 402 and the vehicle environment information acquisition unit 403 are functional blocks for acquiring the surrounding environment information and vehicle environment information detected by the information acquisition device 30, respectively. The map information acquisition unit 406 is a functional block for acquiring the map information stored in the map database 444.

The travel planning unit 410 performs a process of generating a travel path as a travel plan for autonomous driving of the vehicle 10 and a process of determining whether remote control is necessary and sending a remote control request. The travel path specifies how the vehicle 10 travels along the desired route GRT by autonomous driving. The travel path includes route information and speed information. The route information includes a set of desired positions on the road on which the vehicle 10 travels. The speed information is information specifying the speed for the position on the travel path.

Typically, the travel planning unit 410 includes a blind spot calculation unit 411, a passing plan generation unit 413, a remote control request determination unit 416, and a travel plan generation unit 418.

The blind spot calculation unit 411 calculates the blind spot BSD based on the surrounding environment information and the vehicle environment information. For example, the blind spot calculation unit 411 estimates from the detected information on the position and shape of the landmark OBJ and the detected information on the position and orientation of the vehicle 10 an area that cannot be perceived by the surroundings sensor 32 due to the landmark OBJ, and uses the estimated area as the blind spot BSD. In particular, the blind spot BSD is an area where information is detected in order to determine the necessity of remote control. For example, the blind spot BSD is an area where the necessity of remote control is different depending on information on traffic conditions in that area (such as presence of another vehicle OV). The blind spot calculation unit 411 may calculate a plurality of blind spots BSDs. The blind spot calculation unit 411 sends the calculated blind spot BSD to the passing plan generation unit 413.

The passing plan generation unit 413 calculates a speed plan. The passing plan generation unit 413 sends the calculated speed plan to the remote control request determination unit 416 and the travel plan generation unit 418. When calculating the speed plan, the passing plan generation unit 413 acquires or calculates information on the blind spot elimination position Pa, the control standby conditions, the predetermined allowable deceleration, and the predetermined time for the speed plan.

The blind spot elimination position Pa is given according to the blind spot BSD acquired from the blind spot calculation unit 411. The control standby conditions may be either information acquired as the map information or information calculated based on the surrounding environment information. For example, the control standby condition may be that the stop line is perceived and the vehicle 10 stops at the stop line. The predetermined allowable deceleration and the predetermined time for the speed plan may be either values given in advance to the program or values stored in advance in a memory. Alternatively, the predetermined allowable deceleration and the predetermined time for the speed plan may be information acquired via the communication device 50. The predetermined allowable deceleration and the predetermined time for the speed plan are typically given experimentally optically for the remote support system 100.

The remote control request determination unit 416 determines whether the vehicle 10 is in the situation where the vehicle 10 needs remote control. In particular, the remote control request determination unit 416 determines the necessity of remote control by the first determination process and the second determination process. The remote control request determination unit 416 sends the determination result regarding the necessity of remote control to the travel plan generation unit 418 and the remote control request unit 420.

The travel plan generation unit 418 generates a travel path as a travel plan for the vehicle 10. Typically, the travel plan generation unit 418 generates a route plan and a speed plan on the desired route GRT based on the map information, the surrounding environment information, and the vehicle environment information. The travel plan generation unit 418 sends the generated travel path to the travel device 60.

In particular, when the vehicle 10 passes through the area where there is a blind spot BSD, the travel plan generation unit 418 generates a travel path based on the speed plan sent from the passing plan generation unit 413 and the determination result regarding the necessity of remote control sent from the remote control request determination unit 416. More specifically, when the results of the first determination process and the second determination process are positive, the travel plan generation unit 418 generates for the second travel route RT2 such a travel path that the vehicle 10 reaches the speed Va specified in the speed plan at the blind spot elimination position Pa. When it is determined at the blind spot elimination position Pa that the vehicle 10 is in the situation where the vehicle 10 needs remote control, the travel plan generation unit 418 generates a travel path according to the speed plan generated by the passing plan generation unit 413. When the results of the first determination process and the second determination process are negative, the travel plan generation unit 418 generates a travel path that satisfies the control standby conditions.

The remote control request unit 420 is a device for sending via the communication network N a remote control request to the operator who operates the remote control device 2. The remote control request unit 420 sends a remote control request to the remote control device 2 according to the determination result regarding the necessity of remote control sent from the remote control request determination unit 416.

5. Specific Process That Is Performed by Autonomous Driving Control Device

Figure 6:
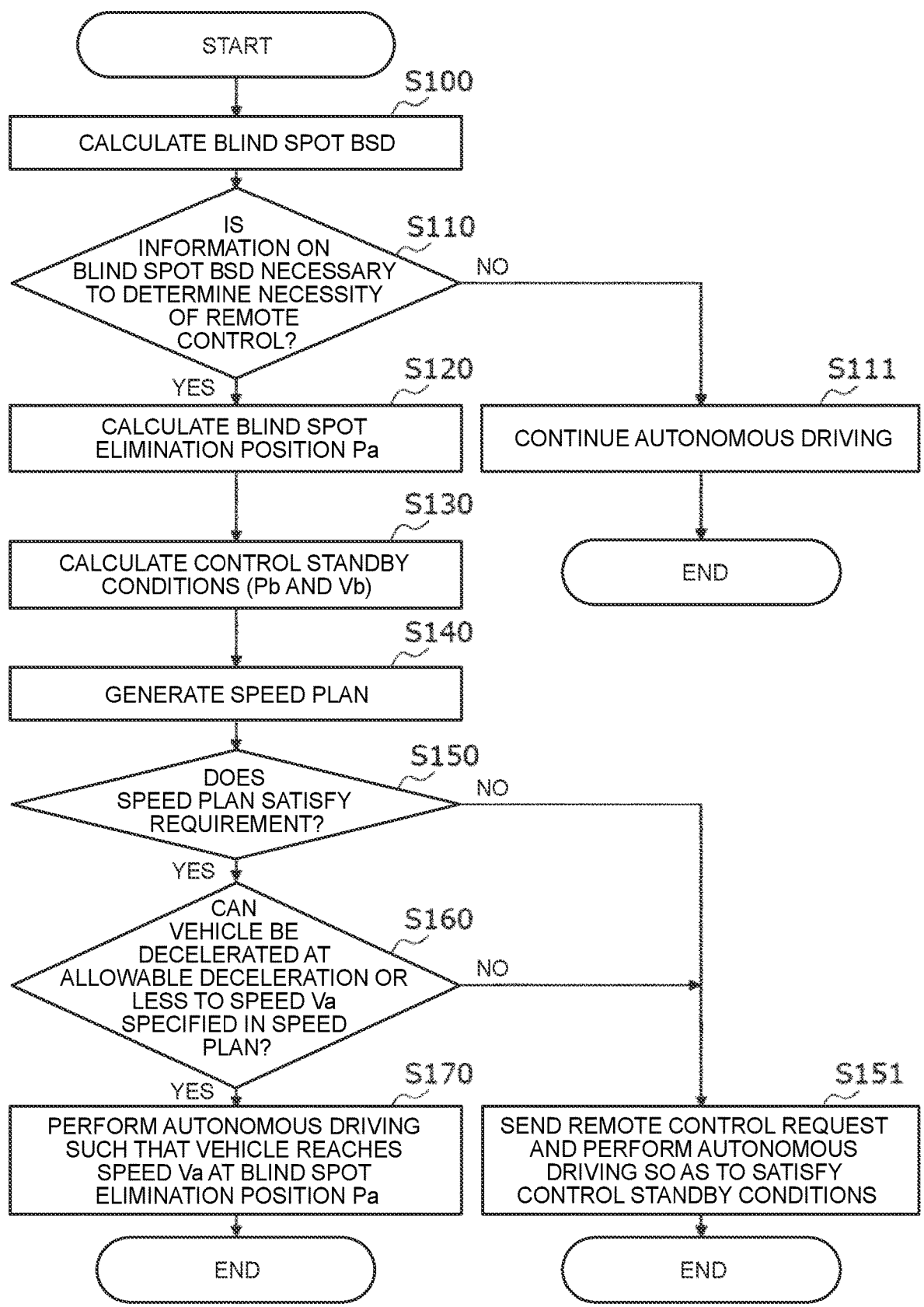
FIG. 6 is a flowchart of a process that is performed by the autonomous driving control device.

FIG. 6 is a flowchart of a process that is performed by the autonomous driving control device 40. The process shown in FIG. 6 typically starts when the vehicle 10 is traveling in the area where there is a blind spot BSD by autonomous driving. This area may be either an area given in advance as the map information or an area determined from the surrounding environment information.

In step S100, the blind spot calculation unit 411 calculates the blind spot BSD based on the surrounding environment information and the vehicle environment information. The blind spot BSD may be either an area where the information acquisition device 30 cannot acquire information due to the landmark OBJ around the vehicle 10 or an area where the information acquisition device 30 cannot acquire information due to the detection capability of the sensor. Alternatively, the blind spot BSD may be a combination of these areas. The blind spot calculation unit 411 may calculate a plurality of blind spots BSDs.

After step S100, the process proceeds to step S110.

In step S110, the blind spot calculation unit 411 determines whether information on the blind spot BSD calculated in step S100 is necessary to determine the necessity of remote control. For example, when the necessity of remote control is different depending on whether there is another vehicle OV in the blind spot BSD, the blind spot calculation unit 411 determines that the information on the blind spot BSD is necessary to determine the necessity of remote control.

When the blind spot calculation unit 411 determines that the information on the blind spot BSD is necessary to determine the necessity of remote control (step S110, Yes), the process proceeds to step S120. In this case, the blind spot calculation unit 411 sends the calculated blind spot BSD to the passing plan generation unit 413. The blind spot calculation unit 411 may send only the part of the blind spot BSD of which information is necessary to determine the necessity of remote control. For example, the blind spot calculation unit 411 may send only a lane area portion of the blind spot BSD.

When the blind spot calculation unit 411 determines that the information on the blind spot BSD is not necessary to determine the necessity of remote control (step S110, No), the process proceeds to step S111, and the vehicle 10 continues autonomous driving. In this case, the remote control request unit 420 does not send a remote control request. The process ends after step S111.

In step S120, the passing plan generation unit 413 calculates the blind spot elimination position Pa according to the blind spot BSD. FIG. 7 is a conceptual diagram showing an example of the blind spot elimination position Pa that is calculated according to the blind spot BSD in the case shown in FIG. 3. The blind spot BSD in FIG. 7 is the same as that shown in FIG. 3.

In the example shown in the upper part of FIG. 7, the position where the area of which information is necessary to determine the necessity of remote control (area surrounded by dashed line) is no longer located in the blind spot caused by the landmark OBJ is calculated as the blind spot elimination position Pa. For example, the farthest point of intersection of the desired route GRT and the line (long dashed short dashed line) connecting a point on the boundary of the area of which information is necessary to determine the necessity of remote control and a vertex of the landmark OBJ is calculated as the blind spot elimination position Pa.

In the example shown in the lower part of FIG. 7, the position where the sensor becomes able to detect the range of the area of which information is necessary to determine the necessity of remote control is calculated as the blind spot elimination position Pa. For example, when the range of the area of which information is necessary to determine the necessity of remote control is from a position IP where the vehicle 10 enters the intersection IS to 30 m ahead of the position IP, and the detection distance due to the detection ability of the sensor is 100 m ahead of the position CP of the vehicle 10, 70 m before the position IP where the vehicle 10 enters the intersection IS is calculated as the blind spot elimination position Pa.

Referring back to FIG. 6, the process proceeds to step S130 after step S120.

In step S130, the passing plan generation unit 413 calculates the control standby conditions. The control standby conditions may be either information acquired as the map information or information calculated based on the surrounding environment information.

After step S130, the process proceeds to step S140.

In step S140, the passing plan generation unit 413 generates a speed plan. In particular, the speed plan specifies the speed Va for the blind spot elimination position Pa. For example, when it is assumed that the speed plan is generated such that the vehicle 10 is decelerated at a constant acceleration along the first travel route RT1, the speed Va can be given by the solution of the following simultaneous equations (1), where T represents the predetermined time. In the simultaneous equations (1), g represents the acceleration of the vehicle 10 and is given as the solution of the simultaneous equations (1).

Expression 1

$$\begin{cases} Vb = Va + g \cdot T \\ Vb^2 - Va^2 = 2 \cdot g \cdot |Pa - Pb| \end{cases} \quad (1)$$

After step S140, the process proceeds to step S150.

In step S150 (first determination process), the remote control request determination unit 416 determines whether the speed plan satisfies a requirement. That is, the remote control request determination unit 416 determines whether the generated speed plan meets the requirement that the vehicle be decelerated at the predetermined allowable deceleration or less for the predetermined time from the blind spot elimination position Pa to satisfy the control standby conditions.

When the remote control request determination unit 416 determines that the speed plan satisfies the requirement (step S150, Yes), the process proceeds to step S160. When the remote control request determination unit 416 determines that the speed plan does not satisfy the requirement (step S150, No), the process proceeds to step S151.

The acceleration g given as the solution of the simultaneous equations (1) is the acceleration in the speed plan when the vehicle 10 is decelerated at a constant acceleration along the first travel route RT1. This can be considered to indicate that the speed plan including an acceleration (deceleration) smaller than g cannot be generated. Accordingly, in step S150 (first determination process), the remote control request determination unit 416 may determine whether the speed plan satisfies the requirement based on whether g given as the solution of the simultaneous equations (1) is equal to or smaller than the allowable deceleration. In this case, step S150 (first determination process) may be performed before step S140. When the remote control request determination unit 416 determines that the speed plan satisfies the requirement (step S150, Yes), step S140 may be performed to generate the first speed plan satisfying the requirement. In this case, the speed plan to be generated does not have to be the speed plan when the vehicle 10 is decelerated at a constant acceleration along the first travel route RT1.

In step S151, the remote control request determination unit 416 sends the determination result indicating that the vehicle 10 is in the situation where the vehicle 10 needs remote control to the travel plan generation unit 418 and the remote control request unit 420. The remote control request unit 420 then sends a remote control request. The travel plan generation unit 418 generates such a travel path that the vehicle 10 satisfies the control standby conditions, and sends the generated travel path to the travel device 60. As a result, the vehicle 10 travels by autonomous driving so as to satisfy the control standby conditions. The process ends after step S151.

In step S160 (second determination process), the remote control request determination unit 416 determines whether the vehicle 10 can be decelerated at the allowable deceleration or less to the speed Va for the blind spot elimination position Pa specified in the speed plan.

When the remote control request determination unit 416 determines that the vehicle 10 can be decelerated at the allowable deceleration or less to the speed Va (step S160, Yes), the process proceeds to step S170. When the remote control request determination unit 416 determines that the vehicle 10 cannot be decelerated at the allowable deceleration or less to the speed Va (step S160, No), the process proceeds to step S151.

In step S170, the remote control request determination unit 416 sends the determination result indicating that the vehicle 10 is not in the situation where the vehicle 10 needs remote control to the passing plan generation unit 413 and the travel plan generation unit 418. The travel plan generation unit 418 then generates such a travel path that the vehicle 10 reaches the speed Va at the blind spot elimination position Pa, and sends the generated travel path to the travel device 60. As a result, the vehicle 10 travels by autonomous driving such that the vehicle 10 reaches the speed Va at the blind spot elimination position Pa. The process ends after step S170.

6. Effects

As described above, according to the remote support system 100 of the present embodiment, even when the vehicle 10 is traveling by autonomous driving in the area where there is a blind spot BSD and it is determined at the blind spot elimination position Pa that the vehicle 10 is in the situation where the vehicle 10 needs remote control, there will be the predetermined time until the vehicle 10 satisfies the control standby conditions, and the vehicle 10 can be decelerated at the predetermined allowable deceleration or less to satisfy the control standby conditions. Accordingly, sudden deceleration control for the vehicle 10 will not be performed, and it is possible to prevent a remote control request from being sent frequently. It is also possible to reduce the burden on the remote operator while reducing reduction in safety of the vehicle 10 and disruption of the traffic flow behind the vehicle 10. It is also possible to reduce disruption of the traffic flow due to the vehicle 10 waiting for the start of remote control.

Moreover, the vehicle 10 is instructed to travel along the second travel route by autonomous driving such that the vehicle 10 reaches the speed Va specified in the speed plan at the blind spot elimination position Pa. It is therefore possible to prevent the vehicle 10 from being decelerated with traveling efficiency unnecessarily reduced in order to cause the vehicle 10 to travel according to the speed plan.

What is claimed is:

1. A remote support system that sends a remote control request to a remote operator when a vehicle that is traveling by autonomous driving gets into a situation where the vehicle needs remote control, the remote support system comprising:
　at least one memory storing at least one program; and
　at least one processor coupled to the at least one memory,
　　the at least one processor being configured to execute the at least one program to
　　acquire map information around the vehicle, surrounding environment information on a surrounding environment of the vehicle, and vehicle environment information on a traveling state of the vehicle,
　　determine based on the map information, the surrounding environment information, and the vehicle environment information whether the vehicle is in the situation where the vehicle needs the remote control,
　　calculate a blind spot based on the surrounding environment information and the vehicle environment information, the blind spot being an area where remote control determination information is detectable and where the surrounding environment information is not detectable from a current position of the vehicle, and the remote control determination information being information for determining whether the vehicle is in the situation where the vehicle needs the remote control,
　　calculate a blind spot elimination position, the blind spot elimination position being a position of the vehicle at which the blind spot is eliminated,
　　calculate a control standby condition based on the map information or the surrounding environment information, the control standby condition specifying a position and a speed of the vehicle at which the vehicle waits for start of the remote control when the at least one processor determines that the vehicle is in the situation where the vehicle needs the remote control,
　　generate a speed plan for a first travel route from the blind spot elimination position to the position specified by the control standby condition, the speed plan specifying a speed of the vehicle for a position on the first travel route so as to meet a requirement that the vehicle be decelerated at a predetermined allowable deceleration or less for a predetermined time from the blind spot elimination position to satisfy the control standby condition,
　　instruct, for a second travel route from the current position of the vehicle to the blind spot elimination position, the vehicle to travel along the second travel route by autonomous driving so as to cause the vehicle to reach the speed specified by the speed plan at the blind spot elimination position, and
　execute the at least one program to instruct the vehicle to travel along the first travel route by autonomous driving according to the speed plan when the at least one processor determines at the blind spot elimination position that the vehicle is in the situation where the vehicle needs the remote control.

2. The remote support system according to claim 1, wherein the predetermined time is a determination time for the remote operator.

3. The remote support system according to claim 1, wherein the at least one processor is configured to execute the at least one program to:
　make a first determination of whether the at least one processor is able to generate the speed plan that meets the requirement;
　make, for the second travel route, a second determination of whether the vehicle is able to be decelerated at the allowable deceleration or less until the vehicle reaches the speed specified by the speed plan at the blind spot elimination position; and
　stop the autonomous driving on the second travel route and send the remote control request to the remote operator when a result of the first determination or the second determination is negative.

4. A remote support method in which a remote control request is sent to a remote operator when a vehicle that is traveling by autonomous driving gets into a situation where the vehicle needs remote control, the remote support method comprising:
　acquiring, by at least one processor that executes at least one program, map information around the vehicle, surrounding environment information on a surrounding environment of the vehicle, and vehicle environment information on a traveling state of the vehicle;
　determining, by the at least one processor, whether the vehicle is in the situation where the vehicle needs the remote control, based on the map information, the surrounding environment information, and the vehicle environment information;
　calculating a blind spot by the at least one processor based on the surrounding environment information and the vehicle environment information, the blind spot being an area where remote control determination information is detectable and where the surrounding environment information is not detectable from a current position of the vehicle, and the remote control determination information being information for determining whether the vehicle is in the situation where the vehicle needs the remote control;
　calculating a blind spot elimination position by the at least one processor, the blind spot elimination position being a position of the vehicle at which the blind spot is eliminated;
　calculating a control standby condition by the at least one processor based on the map information or the surrounding environment information, the control standby condition specifying a position and a speed of the vehicle at which the vehicle waits for start of the remote control when the at least one processor determines that the vehicle is in the situation where the vehicle needs the remote control;
　generating, by the at least one processor, a speed plan for a first travel route from the blind spot elimination position to the position specified by the control standby condition, the speed plan specifying a speed of the vehicle for a position on the first travel route so as to meet a requirement, the requirement being that the vehicle be decelerated at a predetermined allowable deceleration or less for a predetermined time from the blind spot elimination position to satisfy the control standby condition;

instructing, for a second travel route from the current position of the vehicle to the blind spot elimination position, the vehicle to travel along the second travel route by autonomous driving by the at least one processor so as to cause the vehicle to reach the speed specified by the speed plan at the blind spot elimination position; and instructing the vehicle to travel along the first travel route by autonomous driving according to the speed plan by the at least one processor when the at least one processor determines at the blind spot elimination position that the vehicle is in the situation where the vehicle needs the remote control.

5. The remote support method according to claim 4, further comprising:

making a first determination by the at least one processor, the first determination being a determination of whether the at least one processor is able to generate the speed plan that meets the requirement;

making a second determination for the second travel route by the at least one processor, the second determination being a determination of whether the vehicle is able to be decelerated at the allowable deceleration or less until the vehicle reaches the speed specified by the speed plan at the blind spot elimination position; and stopping the autonomous driving on the second travel route and sending the remote control request to the remote operator by the at least one processor when a result of the first determination or the second determination is negative.

* * * * *